US010699184B2

(12) United States Patent
Paluri

(10) Patent No.: US 10,699,184 B2
(45) Date of Patent: Jun. 30, 2020

(54) UPDATING PREDICTIONS FOR A DEEP-LEARNING MODEL

(71) Applicant: Facebook, Inc., Menlo Park, CA (US)

(72) Inventor: Balmanohar Paluri, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 773 days.

(21) Appl. No.: 15/394,289

(22) Filed: Dec. 29, 2016

(65) Prior Publication Data

US 2018/0189672 A1 Jul. 5, 2018

(51) Int. Cl.
*G06N 3/04* (2006.01)
*G06Q 30/02* (2012.01)
*G06Q 50/00* (2012.01)
*G06N 20/00* (2019.01)
*G06N 99/00* (2019.01)
*G06N 7/00* (2006.01)

(52) U.S. Cl.
CPC ........... *G06N 3/0454* (2013.01); *G06N 20/00* (2019.01); *G06N 99/00* (2013.01); *G06Q 30/02* (2013.01); *G06Q 50/01* (2013.01); *G06N 7/005* (2013.01)

(58) Field of Classification Search
CPC .... G06N 3/0454; G06N 99/005; G06N 7/005; G06Q 50/01; G06Q 30/02
USPC .......................................................... 706/12
See application file for complete search history.

(56) References Cited

U.S. PATENT DOCUMENTS

| 9,443,320 | B1* | 9/2016 | Gaidon | G06K 9/00 |
| 9,514,391 | B2* | 12/2016 | Perronnin | G06K 9/4628 |
| 9,648,130 | B1* | 5/2017 | Tam | H04L 67/306 |
| 9,798,612 | B1* | 10/2017 | Foerster | G06N 3/04 |
| 9,940,548 | B2* | 4/2018 | Ishii | G06K 9/46 |
| 10,002,329 | B2* | 6/2018 | Mehanna | G06N 20/00 |
| 10,121,108 | B2* | 11/2018 | Miserendino | G06F 21/566 |
| 10,169,647 | B2* | 1/2019 | Gur | G06K 9/4628 |
| 10,339,468 | B1* | 7/2019 | Johnston | G06N 20/00 |
| 10,366,233 | B1* | 7/2019 | Feinman | G06N 7/005 |

(Continued)

OTHER PUBLICATIONS

Yang et al., "Stacked Attention Networks for Image Question Answering" Jun. 27-30, 2016, IEEE Conference on Computer Vision and Pattern Recognition (CVPR), pp. 21-29. (Year: 2016).*

(Continued)

*Primary Examiner* — Miranda M Huang
*Assistant Examiner* — Chase P. Hinckley
(74) *Attorney, Agent, or Firm* — Baker Botts L.L.P.

(57) ABSTRACT

In one embodiment, a system retrieves a first feature vector for an image. The image is inputted into a first deep-learning model, which is a first-version model, and the first feature vector may be output from a processing layer of the first deep-learning model for the image. The first feature vector using a feature-vector conversion model to obtain a second feature vector for the image. The feature-vector conversion model is trained to convert first-version feature vectors to second-version feature vectors. The second feature vector is associated with a second deep-learning model, and the second deep-learning model is a second-version model. The second-version model is an updated version of the first-version model. A plurality of predictions for the image may be generated using the second feature vector and the second deep-learning model.

18 Claims, 7 Drawing Sheets

(56) References Cited

U.S. PATENT DOCUMENTS

| | | | | |
|---|---|---|---|---|
| 2010/0189354 | A1* | 7/2010 | de Campos | G06K 9/00597 |
| | | | | 382/190 |
| 2015/0324689 | A1* | 11/2015 | Wierzynski | G06N 3/08 |
| | | | | 706/20 |
| 2016/0078361 | A1* | 3/2016 | Brueckner | H04L 67/10 |
| | | | | 706/12 |
| 2016/0096270 | A1* | 4/2016 | Ibarz Gabardos | B25J 9/161 |
| | | | | 700/253 |
| 2016/0140425 | A1* | 5/2016 | Kulkarni | G06K 9/4628 |
| | | | | 382/159 |
| 2016/0210552 | A1* | 7/2016 | Kasabov | G06N 3/049 |
| 2016/0259994 | A1* | 9/2016 | Ravindran | G06N 3/08 |
| 2017/0124432 | A1* | 5/2017 | Chen | G06K 9/46 |
| 2017/0147944 | A1* | 5/2017 | Csurka | G06N 3/0454 |
| 2017/0161640 | A1* | 6/2017 | Shamir | G06N 20/00 |
| 2017/0177972 | A1* | 6/2017 | Cricri | G06K 9/4671 |
| 2017/0206431 | A1* | 7/2017 | Sun | G06N 3/084 |
| 2017/0220897 | A1* | 8/2017 | Chidlovskii | G06K 9/00684 |
| 2017/0249455 | A1* | 8/2017 | Permeh | G06F 21/566 |
| 2017/0293638 | A1* | 10/2017 | He | G06F 16/5846 |
| 2017/0364771 | A1* | 12/2017 | Pinheiro | G06K 9/6271 |
| 2018/0024968 | A1* | 1/2018 | Clinchant | G06N 3/0454 |
| | | | | 706/12 |
| 2018/0046941 | A1* | 2/2018 | Sule | G06N 20/00 |
| 2018/0061059 | A1* | 3/2018 | Xu | G06N 3/0454 |
| 2018/0082156 | A1* | 3/2018 | Jin | G06F 17/214 |
| 2018/0150572 | A1* | 5/2018 | Yates | G06F 16/9535 |
| 2018/0150726 | A1* | 5/2018 | Gorban | G06K 9/6257 |
| 2018/0150766 | A1* | 5/2018 | Choi | G06N 20/00 |
| 2018/0157916 | A1* | 6/2018 | Doumbouya | G06K 9/00979 |
| 2018/0165547 | A1* | 6/2018 | Huang | G06K 9/6232 |
| 2018/0210896 | A1* | 7/2018 | Guo | G06F 16/51 |
| 2018/0341872 | A1* | 11/2018 | Wang | G06T 7/11 |

OTHER PUBLICATIONS

Xie et al., "Task-Driven Feature Pooling for Image Classification" Dec. 7-13, 2015, IEEE International Conference on Computer Vision (ICCV), pp. 1179-1187. (Year: 2016).*

Vig et al., "Large-Scale Optimization of Hierarchical Features for Saliency Prediction in Natural Images" 2014 IEEE Conference on Computer Vision and Pattern Recognition, pp. 2798-2805. (Year: 2014).*

Buchman et al., "Mapping feature models onto domain models: ensuring consistency of configured domain models" 2014 Software Systems Model, 13, pp. 1495-1527. (Year: 2014).*

Heidenreich et al., "FeatureMapper: Mapping Features to Models" May 10-18, 2008, ICSE'08, pp. 943-944. (Year: 2008).*

Jiang et al., "Combination Features and Model for Human Detection" Jun. 7-12, 2015, IEEE Conference on Computer Vision and Pattern Recognition (CVPR), pp. 240-248. (Year: 2015).*

Shrivastava et al., "Class Consistent Multi-Modal Fusion with Binary Features" Jun. 7-12, 2015, IEEE Conference on Computer Vision and Pattern Recognition (CVPR), pp. 2282-2291. (Year: 2015).*

Wang et al., "Modality and Component Aware Feature Fusion for RGB-D Scene Classification" Jun. 27-30, 2016, IEEE Conference on Computer Vision and Pattern Recognition (CVPR), pp. 5995-6004. (Year: 2016).*

Wang et al., "Additive Nearest Neighbor Feature Maps" Dec. 7-13, 2015, IEEE International Conference on Computer Vision (ICCV), pp. 2866-2874. (Year: 2015).*

Wu et al., "Constrained Deep Transfer Feature Learning and its Applications" Jun. 27-30, 2016, IEEE Conference on Computer Vision and Pattern Recognition (CVPR), pp. 5101-5109. (Year: 2016).*

Zhu et al., "Discriminative Multi-Modal Feature Fusion for RGBD Indoor Scene Recognition" Jun. 27-30, 2016, IEEE Conference on Computer Vision and Pattern Recognition (CVPR), pp. 2969-2976. (Year: 2016).*

Fang et al., "Collaborative Feature Learning from Social Media" Jun. 7-12, 2015, IEEE Conference on Computer Vision and Pattern Recognition (CVPR), pp. 577-585. (Year: 2015).*

Girshick et al., "Region-Based Convolutional Networks for Accurate Object Detection and Segmentation" Jan. 1, 2016, IEEE Transactions on Pattern Analysis and Machine Intelligence, vol. 38, Issue 1, pp. 142-158. (Year: 2016).*

Honari et al., "Recombinator Networks: Learning Coarse-to-Fine Feature Aggregation" Jun. 27-30, 2016, IEEE Conference on Computer Vision and Pattern Recognition, pp. 5743-5752. (Year: 2016).*

Kobayashi et al., "Structured Feature Similarity with Explicit Feature Map" Jun. 27-30, 2016, IEEE Conference on Computer Vision and Pattern Recognition (CVPR), pp. 1211-1219. (Year: 2016).*

Shayegan et al., "A Novel Two-Stage Spectrum-Based Approach for Dimensionality Reduction: A Case Study on the Recognition of Handwritten Numerals" May 12, 2014, Journal of Applied Mathematics, pp. 1-14. (Year: 2014).*

Wu et al., "Constrained Deep Transfer Feature Learning and its Applications" Jun. 27, 2016, IEEE Conference on Computer Vision and Pattern Recognition, pp. 5501-5109. (Year: 2016).*

Sener et al., "Learning Transferrable Representations for Unsupervised Domain Adaptation" Dec. 5, 2016, 30th Conference on Neural Information Processing Systems, pp. 1-9. (Year: 2016).*

Li et al., "Learning with Augmented Features for Supervised and Semi-Supervised Heterogeneous Domain Adaptation" Jun. 2014, IEEE Transactions on Pattern Analysis and Machine Intelligence, vol. 36, No. 6, pp. 1134-1148. (Year: 2014).*

Yamada et al., "Domain Adaptation for Structured Regression" Dec. 13, 2013, International Journal of Computer Vision, No. 109, pp. 126-145. (Year: 2014).*

Lin et al., "Cross-Domain Recognition by Identifying Joint Subspaces of Source Domain and Target Domain" Mar. 21, 2016, IEEE Transactions on Cybernetics, vol. 47, No. 4, pp. 1090-1101. (Year: 2016).*

Veit et al., "Learning Visual Clothing Style with Heterogeneous Dyadic Co-occurrences" Dec. 7, 2015, IEEE International Conference on Computer Vision, pp. 4642-4650. (Year: 2015).*

Su et al., "Cross-Quality Distillation" Apr. 1, 2016, pp. 1-19. (Year: 2016).*

Noh et al., "Image Question Answering using Convolutional Neural Network with Dynamic Parameter Prediction" Jun. 27, 2016, IEEE Conference on Computer Vision and Pattern Recognition, pp. 30-38. (Year: 2016).*

Long et al., "Learning Transferable Features with Deep Adaptation Networks" 2015, Proceedings of the 32nd International Conference on Machine Learning, vol. 37. (Year: 2015).*

Fang et al., "Collaborative Feature Learning from Social Media" 2015, pp. 577-585. (Year: 2015).*

* cited by examiner

600 retrieve a first feature vector for an image, wherein the image is inputted into a first deep-learning model, the first deep-learning model being of a first version, and wherein the first feature vector comprises output from a processing layer of the first deep-learning model for the image; — 610 process the first feature vector using a feature-vector conversion model to obtain a second feature vector for the image, the feature-vector conversion model being trained to convert first-version feature vectors to second-version feature vectors, wherein the second feature vector is associated with a second deep-learning model, the second deep-learning model being of a second version, the second version being an updated version of the first version — 620 generate a plurality of predictions for the image using the second feature vector and the second machine-learning model — 630

*FIG. 6*

UPDATING PREDICTIONS FOR A DEEP-LEARNING MODEL

TECHNICAL FIELD

This disclosure generally relates to identification of objects in images.

BACKGROUND

Deep-learning is a type of machine learning that may involve training a model in a supervised or unsupervised setting. Deep-learning models may be trained to learn representations of data. Deep-learning models may be based on a set of algorithms that are designed to model abstractions in data by using a number of processing layers. The processing layers may be made up of non-linear transformations. The processing layers may be fully connected. Deep-learning models may include, as an example and not by way of limitation, neural networks and convolutional neural networks. Convolutional neural networks may be made of up a hierarchy of trainable filters, interleaved with non-linearities and pooling. Convolutional neural networks may be used in large-scale object recognition tasks.

SUMMARY OF PARTICULAR EMBODIMENTS

In particular embodiments, a system may use one or more deep-learning models to generate a plurality of predictions for a plurality of concepts for an image. Each prediction may be a likelihood that a corresponding concept (e.g., red shirt, octopus, politics) is associated with an image. Deep-learning models (e.g., convolutional neural networks) may be trained to determine predictions (i.e., likelihoods) that concepts are associated with an image. Deep-learning models may be trained using a predetermined set of concepts (i.e., using positive and negative samples of images with respect to the concepts). As used herein, a concept associated with an image may include, as an example and not by way of limitation, an identifiable item depicted in whole or in part in an image (e.g., a person, a blue chair, an oak tree, a dog, a logo, a barcode, or a Quick Response code ("QR code)), a visual property of an image or a part of an image (e.g., the color green in an image, a sepia-filtered image, a blurry image, lighting conditions associated with the image), metadata associated with the image, a category associated with the image (e.g., politics, marriage, or clean eating), a mood associated with an image (e.g., spooky or happy), an event associated with an image (e.g., a wedding, a Butch Walker concert, Election Day 2016), a location (e.g., Pennsylvania or Franklin & Marshall College), any concept that may represented by a node in a social graph and that may be associated with an image, any other concept identifiable in or associated with an image, or any combination thereof. Concepts may be arranged in any suitable number of taxonomies. It will be understood that as used herein, an image may be any visual scene that may be captured in one or more frames, including, as an example and not by way of limitation, pictures, videos, or any combination thereof.

Each deep-learning model trained to determine predictions for concepts in images may be of a particular version. As an example and not by way of limitation, deep-learning models may be versions 1, 2, . . . , n. In the same example, an earlier version of the deep-learning model (e.g., version 2) may have 20 processing layers, whereas a later version of the deep-learning model (e.g., version n) may have 1000 processing layers. A feature vector may be extracted from a processing layer of each of the deep-learning models. In particular embodiments, a system may use a feature-vector conversion layer to generate version n predictions (i.e., predictions from the latest version of the model) using an earlier version of the model (i.e., a model of any of versions 1, 2, . . . , n−1).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates an example method for generating predictions using a deep-learning model.

DESCRIPTION OF EXAMPLE EMBODIMENTS

System Overview

Figure 1:
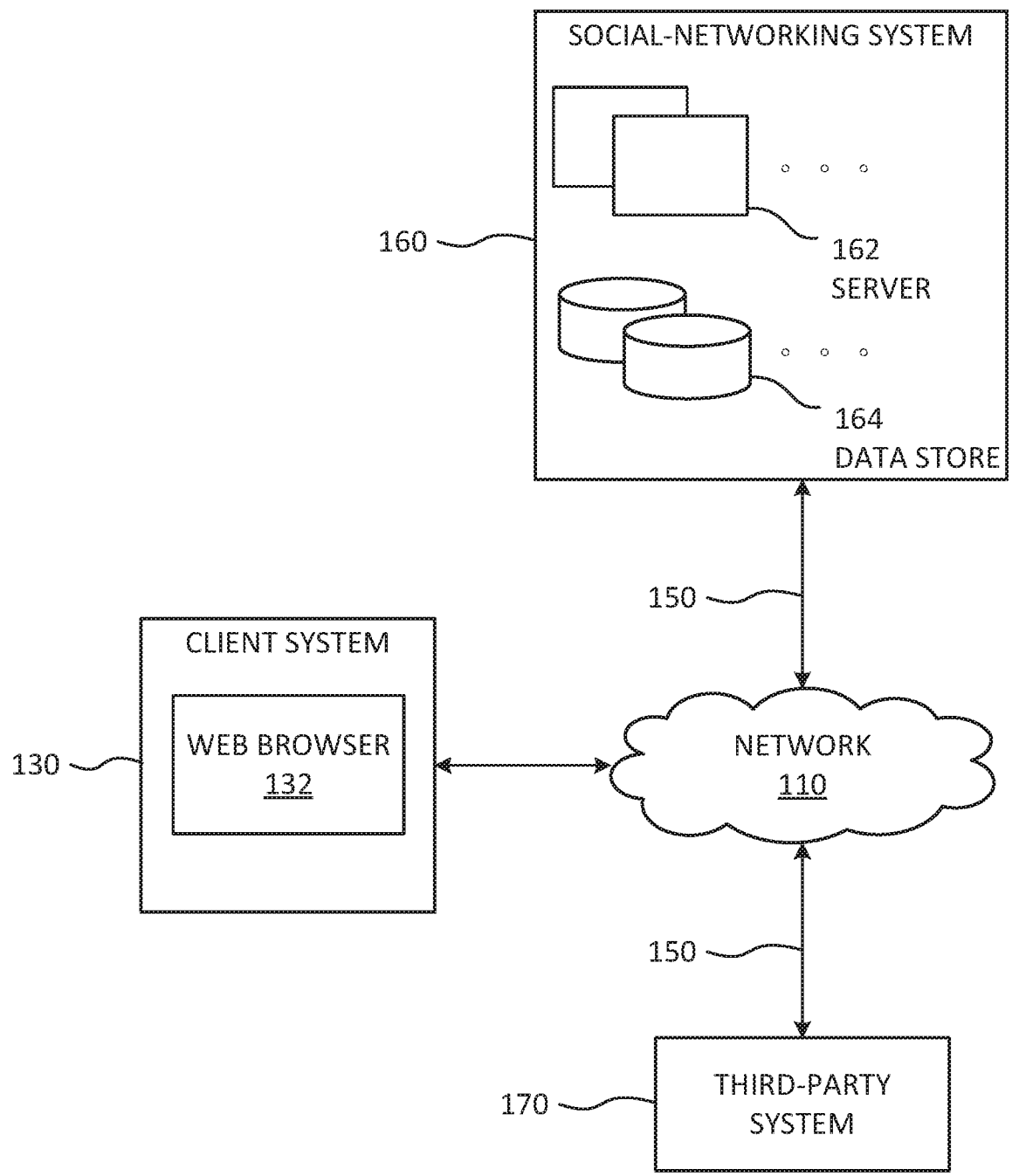
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
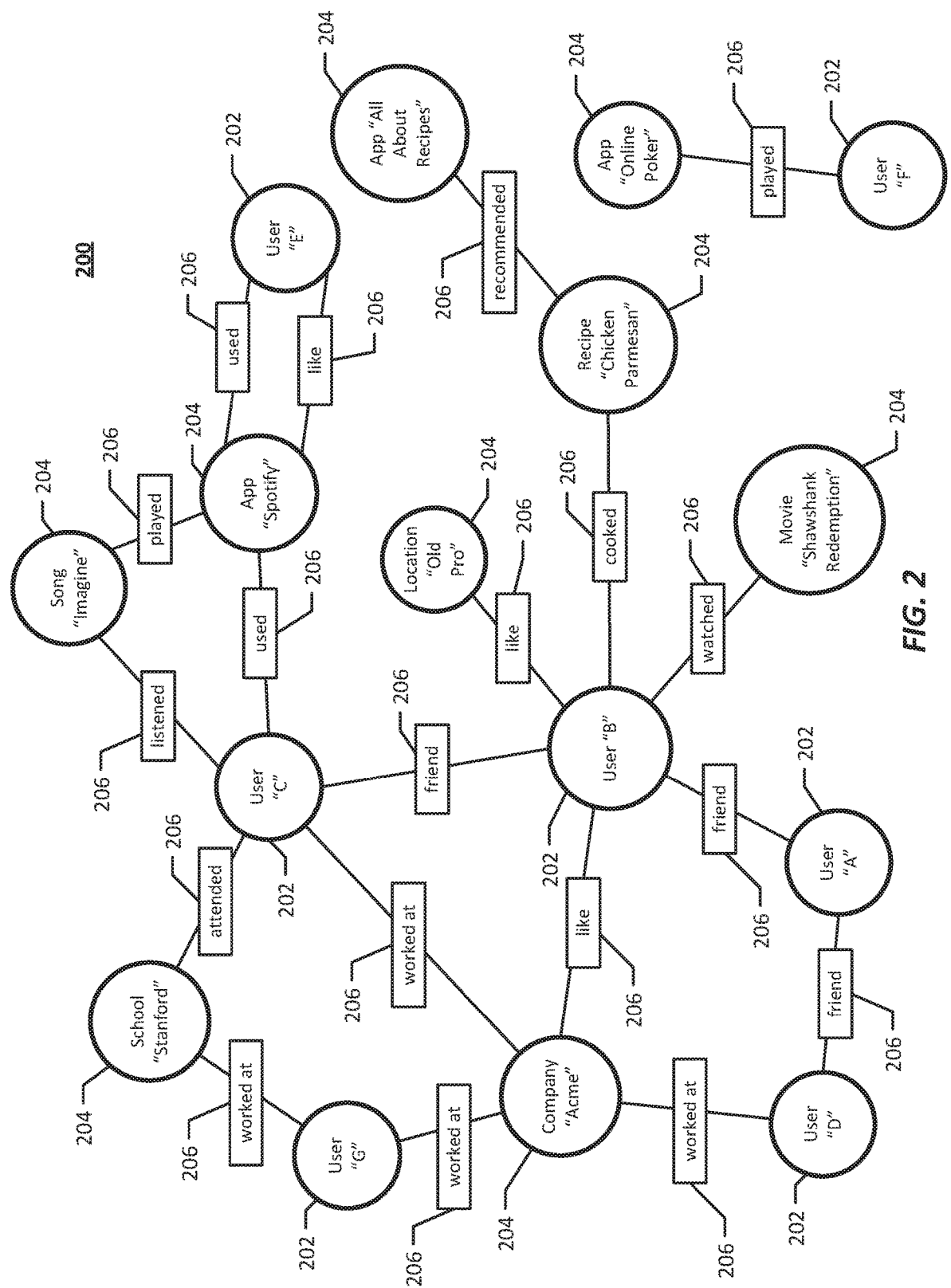
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request"

to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships.

As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Deep-Learning Model for Generating Predictions

Figure 3:
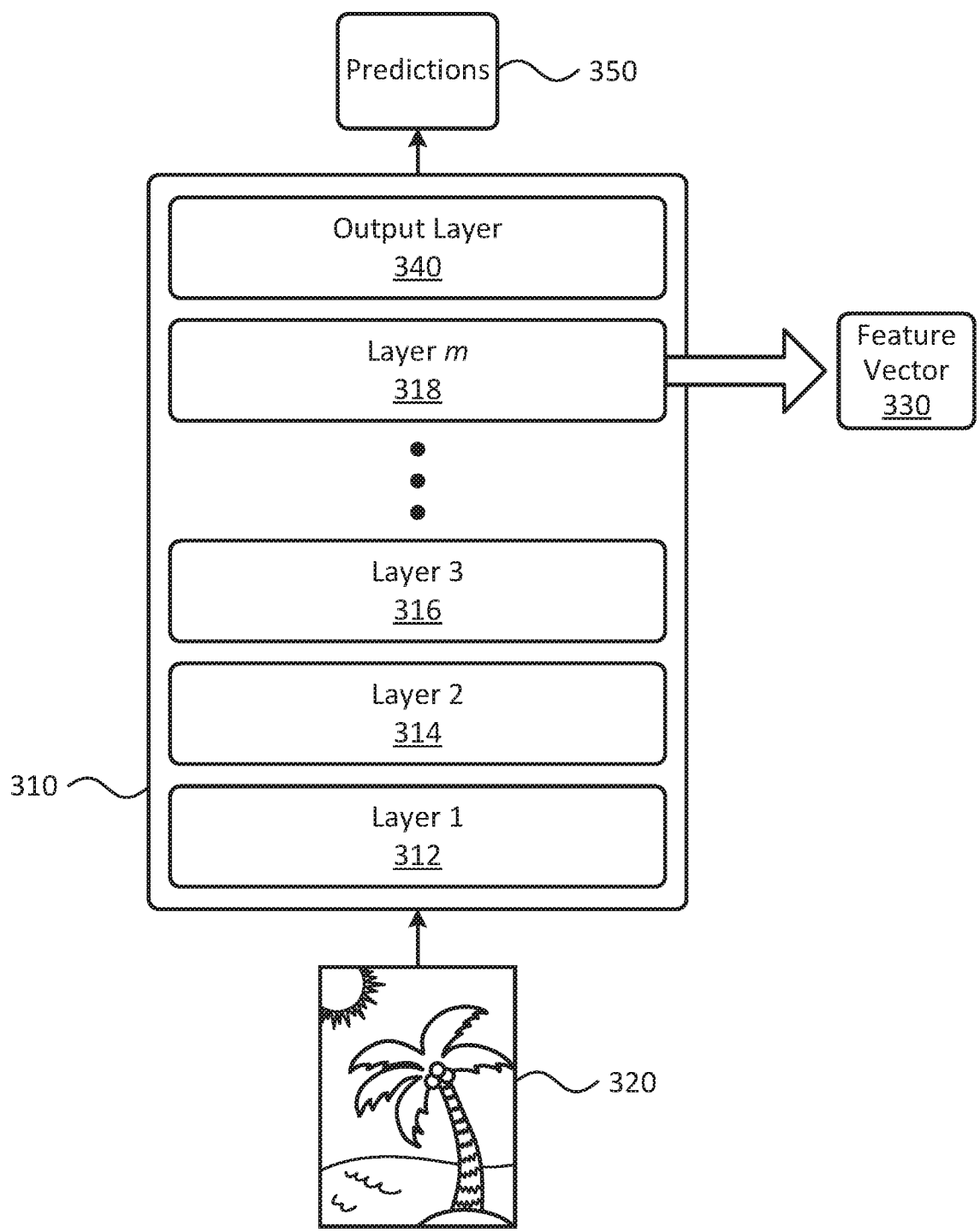
FIG. 3 illustrates an example deep-learning model for predicting concepts in images.

FIG. 3 illustrates an example deep-learning model 310 for predicting concepts in images. Deep-learning model 310 may be any suitable machine-learning model, including, as an example and not by way of limitation, a neural network, a latent neural network, a convolutional neural network, a deep neural network, any other suitable machine-learning model, or any combination thereof. In particular embodiments, deep-learning model 310 may include one or more deep-learning models. Deep-learning model 310 may include one or more indices, which may be dynamically updated as the deep-learning model 310 is trained. The one or more indices may be generated during a training phase of deep-learning model 310. Deep-learning model 310 may be initialized using a random distribution. As an example and not by way of limitation, the random distribution may be a Gaussian distribution.

In particular embodiments, deep-learning model 310 may be trained to detect a set of concepts associated with inputted images (e.g., input image 320). The set of concepts may include any suitable number of concepts (e.g., the 2000 most popular concepts related to social-networking system 160). Deep-learning model 320 may be trained, as an example and not by way of limitation, using training data that includes positive and negative samples for each concept in the set of concepts. In particular embodiments, deep-learning model 310 may have a plurality of layers of abstraction. As shown in the illustrated embodiment of FIG. 3, deep-learning model 310 is depicted as having a plurality of processing layers, including layers 312, 314, 316, and 318, and output layer 340. In particular embodiments, layer 312 may be an input layer for deep-learning model 310. In particular embodiments, one or more of layers 312, 314, 316, and 318 of deep-learning model 310 may be convolutional layers. In particular embodiments, one or more of layers 312, 314, 316, and 318 of deep-learning model 310 may be fully-connected layers.

In particular embodiments, a processing layer (e.g., layer 318) may be selected as the feature layer, and the output of the feature layer may be feature vector 330. Feature vector 330 may be any suitable n-dimensional vector of numerical features that represent information relating to concepts associated with an inputted image 320. The feature vector 330 of the last layer in deep-learning model 310 (i.e., output layer 340) may be the predictions 350. In particular embodiments, the processing layer (i.e., the feature layer) from the which the feature vector 330 is outputted may be the processing layer beneath (i.e., the layer before) the output layer 340 in deep-learning model 310. Thus, feature vector 330 may contain information from all of the preceding layers (e.g., layers 312, 314, and 316) but not the final predictions 350. In particular embodiments, the feature layer (i.e., layer 318) may be selected so that feature vector 330 contains information from a majority of the processing of deep-learning model 310 (e.g., 90% of the processing has already occurred in the preceding processing layers 312, 314, and 316 and the information from that processing is included in feature vector 330). As an example and not by way of limitation, the feature layer may be a deep layer in deep-learning model 310. Feature vector 330 may be unique to the inputted image 320. As an example and not by way of limitation, feature vector 330 may include different numerical features for a different inputted image 320. Each feature vector 330 may be stored with its respective inputted image 320. As an example and not by way of limitation, a user of social-networking system 160 may upload an image 320 to social-networking system 160, and social-networking system 160 may process the image using deep-learning model 310. As part of this processing, social-networking system 160 may determine the feature vector 330 for the uploaded image 320. Social-networking system 160 may also store the feature vector 330 in associated with the uploaded image 320 in a data store 164 of social-networking system 160. As an example and not by way of limitation, feature vector 330 may be stored in associated with the node in social graph 200 that corresponds to the uploaded image 320. As another example and not by way of limitation, feature vector 330 may be stored locally on the client system 130 associated with the user who uploaded the image 320.

One or more outputs may be generated by processing inputted image 320 with deep-learning model 310. The one or more outputs may correspond to one or more predictions with respect to the concepts based on which deep-learning model 310 was trained. In particular embodiments, each prediction may correspond to a likelihood that a respective concept is associated with the image 320. As an example and not by way of limitation, deep-learning model 310 may be trained to detect concepts that include Demi Lovato, computers, Democratic National Convention 2016, Philadelphia, red t-shirt, octopus, singing, ocean, and palm tree. In the same example, deep-learning model 310 may generate predictions 350 (i.e., outputs) that each correspond to a likelihood (e.g., a scalar value between 0 and 1) that a respective concept is associated with (e.g., visually represented in or otherwise associated with) the inputted image. The inputted image may be, as an example and not by way of limitation, a photograph of Demi Lovato singing on stage at the Democratic National Convention in Philadelphia, so deep-learning model 310 may output predictions that each correspond to a high likelihood that a respective of these concepts (i.e., Demi Lovato, singing, Philadelphia, and Democratic National Convention 2016) are associated with (e.g., visually represented in) the photograph inputted into deep-learning model 310.

In particular embodiments, deep-learning model 310 may be of a particular version. As an example and not by way of limitation, the first deep-learning model 310 trained to generate predictions based on an input image and a set of concepts may be the first version model. A second version deep-learning model 310 may be an updated version, as compared to the first version. As an example and not by way of limitation, at an earlier date, social-networking system 160 may have inputted images into a version 1 model, which then generated predictions for each image. Today, however, social-networking system 160 may input images into a version n model, which generates predictions for each image. There may be any suitable number of versions of deep-learning model 310. In particular embodiments, different versions of deep-learning model 310 may have different dimensions. As an example and not by way of limitation, the version 1 model may have no layers (i.e., not a neural network), the version 2 model may have 10 layers, the version 6 through 8 models may have 20 layers, and the latest version (i.e., version n) may have 1000 layers. For each version of the deep-learning model 310, the inputted images may be the same, but the concepts based on which the deep-learning models 310 are trained may be different.

Although this disclosure describes and illustrates particular embodiments of FIG. 3 as being implemented by social-networking system 160, this disclosure contemplates any suitable embodiments of FIG. 3 as being implemented by any suitable platform or system. As an example, and not by way of limitation, particular embodiments of FIG. 3 may be implemented by client system 130, third-party system 170, or any other suitable system. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Feature-Vector Conversion

Figure 4:
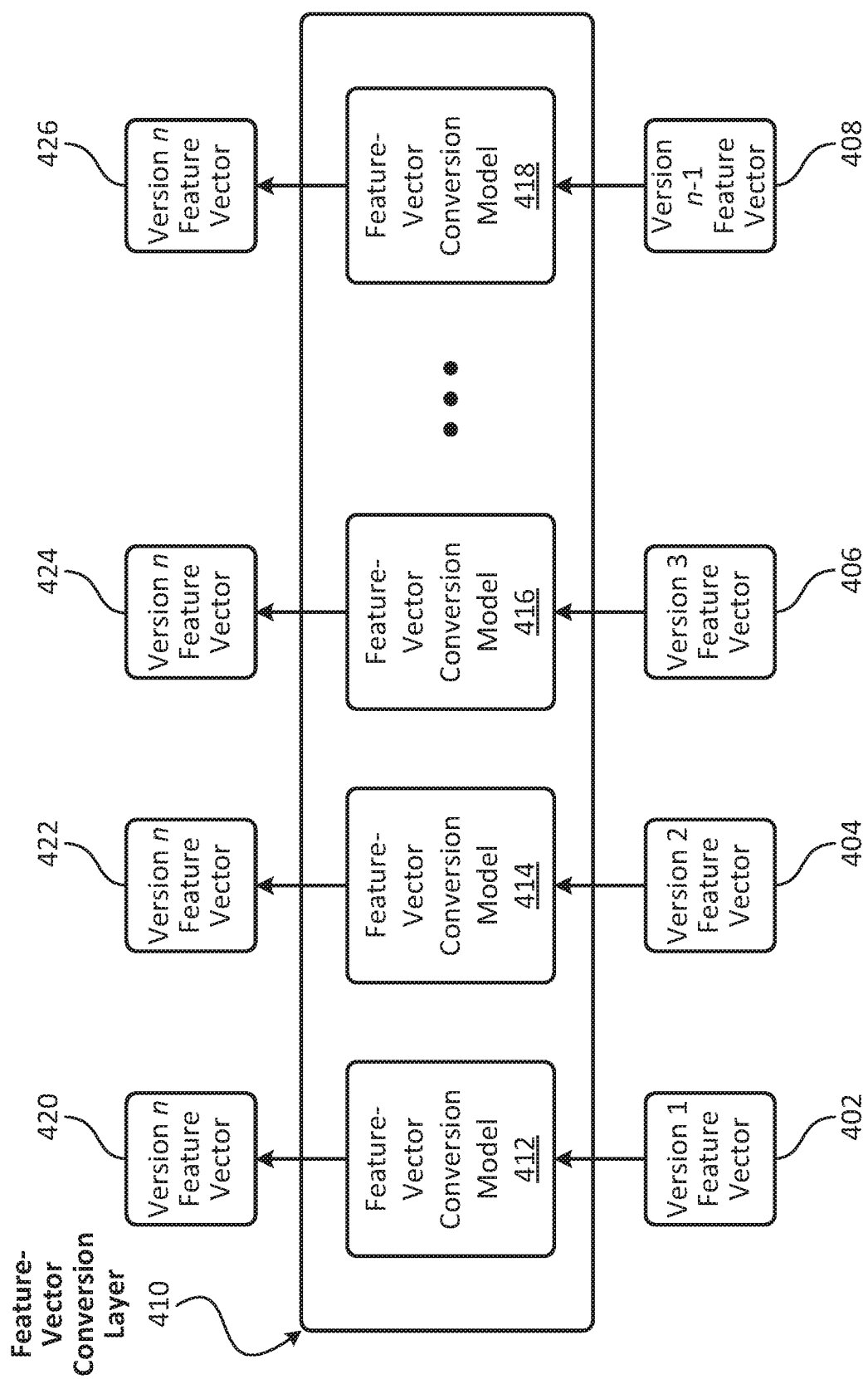
FIG. 4 illustrates an example feature-vector conversion layer.

FIG. 4 illustrates an example feature-vector conversion layer 410. In particular embodiments, it may be necessary or desirable to generate predictions for each image in the system from the most current version of deep-learning model 310 (i.e., version n). As an example and not by way of limitation, predictions from the current version n of deep-learning model 310 may be used to facilitate image searches on social-networking system 160. In order to generate predictions of version n (i.e., the current version of deep-learning model 310), social-networking system 160 may run all of the existing images in its system (e.g., all images hosted/stored by social-networking system 160) that were already processed using existing earlier-version deep-learning models 310 through the newest, current version n of the deep-learning model 310 to obtain version n predictions for each image. This may take a lot of processing power, however, as there may be billions of images to be processed. In particular embodiments, social-networking system 160 may save processing power (e.g., by avoiding having to re-run billions of images through the version n deep-learning model 310) and storage space (e.g., in data stores 164 of social-networking system 160) by instead using the feature vectors of each image to approximate version n predictions.

In particular embodiments, deep-learning models 310 of differing versions may have different feature vectors 330, because the different version models may be trained using different sets of concepts. As shown in the illustrated embodiment of FIG. 4, a feature vector outputted from a feature layer in a version 1 deep-learning model 310 may be a version 1 feature vector 402, a feature vector outputted from a feature layer in a version 2 deep-learning model 310 may be a version 2 feature vector 404, a feature vector outputted from a feature layer in a version 3 deep-learning model 310 may be a version 3 feature vector 406, and a feature vector outputted from a feature layer in a version n deep-learning model 310 may be a version n−1 feature vector 408. In particular embodiments, social-networking system 160 may convert the feature vector of a first deep-learning model 310 (e.g., a version 3 feature vector) to a feature vector of a second deep-learning model 310 (e.g., version n feature vector) using a model. In particular embodiments, social-networking system may generate n−1 models (i.e., feature-vector conversion models 412, 414, 416, and 418) to convert each earlier-version feature vector (i.e., from each of the n−1 earlier-version deep-learning models 310) to the current version n feature vectors 420, 422, 424, and 426. In particular embodiments, feature-vector conversion models 412, 414, 416, and 418 may be linear models. In particular embodiments, each feature-vector conversion model may be trained using a set of sample images for which feature vectors of the corresponding version (e.g., versions 1 through n−1) and feature vectors of the current version n have been computed (i.e., by running the images through the respective deep-learning models 310). In particular embodiments, each feature-vector conversion model may be specifically trained to convert a particular version feature vector (i.e., outputted from that particular version deep-learning model 310) to the current version feature vector (i.e., version n feature vector). As shown in the illustrated embodiment of FIG. 4, feature-vector conversion model 412 is trained to convert version 1 feature vector 402 to version n feature vector 420. Feature-vector conversion model 414 is trained to convert version 2 feature vector 404 to version n feature vector 422. Feature-vector conversion model 416 is trained to convert version 3 feature vector 406 to version n feature vector 424. Feature-vector conversion model 418 is trained to convert version n−1 feature vector 408 to version n feature vector 426. It will be understood that any suitable number of feature-vector conversion models may be generated to convert earlier-version feature vectors to version n feature vectors, and the particular number of feature-vector conversion models illustrated is for purposes of clarity not for purposes of limitation.

The feature-vector conversion models 412, 414, 416, and 418 may use any suitable computations to map respective version feature vectors (i.e., version 1 to n−1 feature vectors 402, 404, 406, and 408) to version n feature vectors 420, 422, 424, and 426. In particular embodiments, feature-vector conversion models 412, 414, 416, and 418 may use computation (e.g., one or more algorithms) to convert the feature vector for an image to the current version n feature vector that uses less processing power than it would to run the image through the version n deep-learning model 310. Feature-vector conversion models 412, 414, 416, and 418 may be trained to minimize error in converting the respective earlier-version feature vectors to version n feature vectors 420, 422, 424, and 426. Feature-vector conversion models 412, 414, 416, and 418 may include fully-connected layers. Feature-vector conversion models 412, 414, 416, and 418 may include convolutional layers. In particular embodiments, feature-vector conversion layer 410 may include the feature-vector conversion models 412, 414, 416, and 418. Feature-vector conversion layer 410 may be incorporated into a deep-learning model 310 in order to generate version n predictions for an image. In particular embodiments, when a new version of deep-learning model 310 is generated (e.g., deep-learning model version n+1), each of the feature-vector conversion models 412, 414, 416, and 418 may be trained to convert the earlier-version feature vectors for an image to the current version n+1 (e.g., feature-vector conversion model 412 may be trained to convert a version 1 feature vector to a version n+1 feature vector).

Although this disclosure describes and illustrates particular embodiments of FIG. 4 as being implemented by social-networking system 160, this disclosure contemplates any suitable embodiments of FIG. 4 as being implemented by any suitable platform or system. As an example, and not by way of limitation, particular embodiments of FIG. 4 may be implemented by client system 130, third-party system 170, or any other suitable system. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
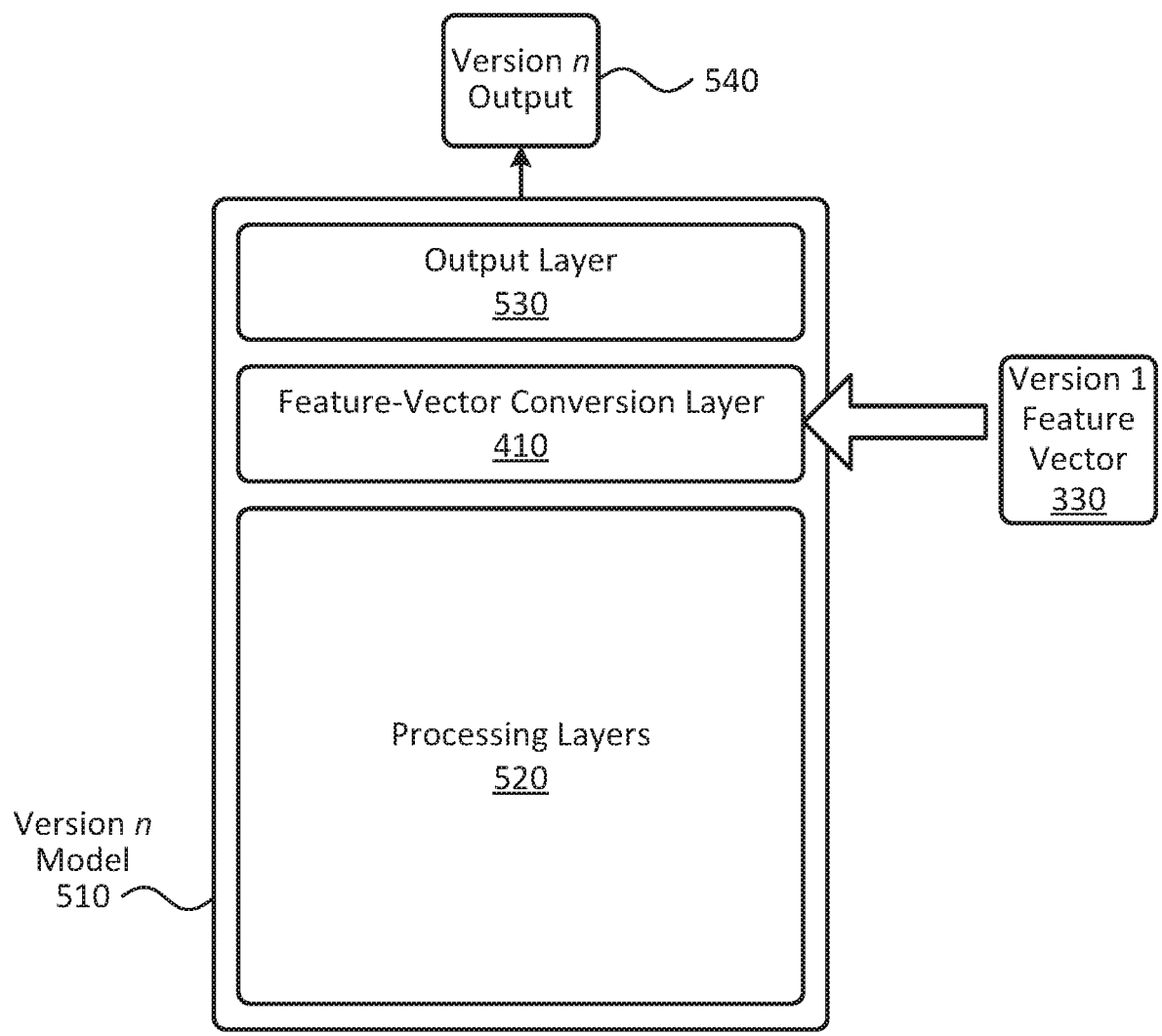
FIG. 5 illustrates an example deep-learning model with a feature-vector conversion layer.

FIG. 5 illustrates an example deep-learning model 310 with a feature-vector conversion layer 410. In particular embodiments, feature-vector conversion layer 410 may be incorporated into a version n model 510. As an example and not by way of limitation, feature-vector conversion layer 410 may be the layer above the feature layer in the version n deep-learning model 510. As another example and not by way of limitation, feature-vector conversion layer 410 may be the layer beneath (i.e., before) the output layer 530 of version n deep-learning model 510. In particular embodiments, feature-vector conversion layer 410 may be incorporated into a new model that may include feature-vector conversion layer 410 and output layer 530, which generates version n predictions 540. It will be understood that feature-vector conversion layer 410 may be incorporated into any suitable model that may take as input into feature-vector conversion layer 410 the earlier-version feature vector to be converted. As shown in the illustrated embodiment of FIG. 5, an earlier-version feature vector (i.e., version 3 feature vector 406) may be taken as input at feature-vector conversion layer 410. As an example and not by way of limitation, social-networking system 160 may access a stored feature vector 406 for an image (e.g., the feature vector 406 may be stored in association with the image) and feed it as input into the feature-vector conversion layer 410. Version n deep-learning model 510 may determine the version of the inputted feature vector (i.e., version 3) and, based on the determined version, may run the inputted feature vector 406 into the corresponding feature-vector conversion model for conversion to a version n feature vector. The version n feature vector may then be processed by the output layer 530, which may generate version n predictions 540. In particular embodiments, predictions for additional concepts may be generated (i.e., concepts that deep-learning model 510 was not trained to detect) using one or more additional models (e.g., linear models) that take a feature vector as input (e.g., the original version or converted version feature vector), as described in U.S. patent application Ser. No. 15/393,773, titled "Adding Concepts to a Deep-Learning Model in Real Time," filed 29 Dec. 2016, which is incorporated by reference herein. Social-networking system 160 may then store the new version n feature vector for the image in association with the image. The version n feature vector that is generated using the feature-vector conversion layer 410 may be an approximation of the version n feature vector that may be obtained by running the image through all of the processing layers 520 of the version n deep-learning model 510.

Although this disclosure describes and illustrates particular embodiments of FIG. 5 being implemented by a system, this disclosure contemplates any suitable embodiments of FIG. 5 as being implemented by any suitable platform or system. As an example, and not by way of limitation, particular embodiments of FIG. 5 may be implemented by social-networking system 160, third-party system 150, or any other suitable system. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates an example method for generating predictions using a deep-learning model 310. The method may begin at step 610, where social-networking system 160 may retrieve a first feature vector for an image. The image may be inputted into a first deep-learning model, and the first deep-learning model may be of a first version. The first feature vector may include output from a processing layer of the first deep-learning model for the image. At step 620, social-networking system 160 may process the first feature vector using a feature-vector conversion model to obtain a second feature vector for the image. The feature-vector conversion model may be trained to convert first-version feature vectors to second-version feature vectors. The second feature vector may be associated with a second deep-learning model, and the second deep-learning model may be of a second version, where the second version may be an updated version of the first version. At step 630, social-networking system 160 may generate a plurality of predictions for the image using the second feature vector and the second deep-learning model.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating predictions using a deep-learning model 310 including the particular steps of the method of FIG. 6, this disclosure contemplates any suitable method for generating predictions using a deep-learning model 310 including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6. As an example and not by way of limitation, the particular steps of the method of FIG. 6 may be performed by client system 130 or third-party system 170.

Systems and Methods

Figure 7:
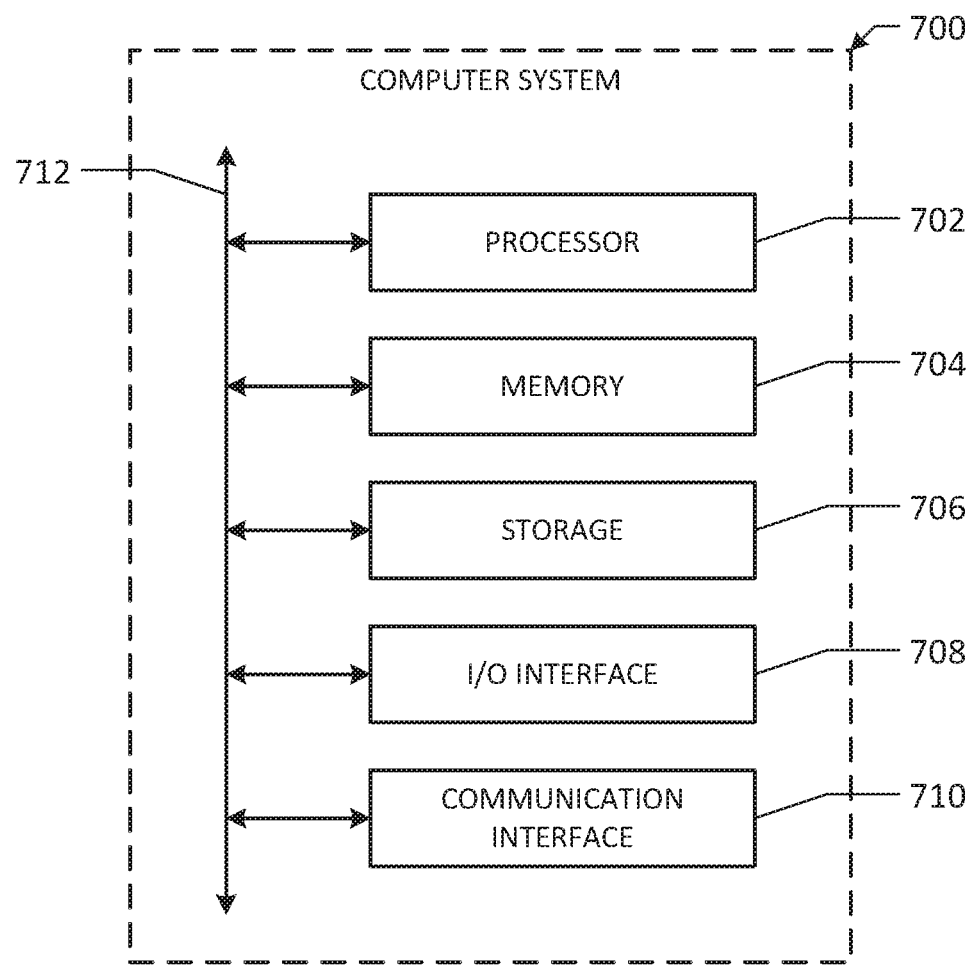
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:
   retrieving, by one or more computing devices, an image;
   retrieving, by one or more of the computing devices, a first feature vector for the image, wherein:
   the first feature vector is a first-version feature vector,
   the first feature vector is generated by a first deep-learning model of a first version,
   the first deep-learning model is trained to perform image classification with respect to a first set of concepts, and
   the first feature vector comprises output from a processing layer of the first deep-learning model for the image;
   retrieving, by one or more of the computing devices, a second deep-learning model requiring second-version feature vectors, wherein the second deep-learning model is an updated version of the first deep-learning model trained to perform image classification with respect to the first set of concepts and an additional set of concepts;
   processing, by one or more of the computing devices, the first feature vector using a feature-vector conversion model to obtain a second feature vector for the image, wherein the second feature vector is a second-version feature vector, and wherein the feature-vector conversion model is trained to convert first-version feature vectors to second-version feature vectors; and
   processing, by one or more of the computing devices, the second feature vector using the second deep-learning model, to generate a plurality of predictions for the image, wherein each of the plurality of predictions comprises a likelihood that a respective concept of the additional set of concepts is associated with the image.

2. The method of claim 1, wherein the processing layer from which the first feature vector is outputted is a layer beneath an output layer of the first deep-learning model.

3. The method of claim 1, further comprising:
   determining that the first feature vector is the first-version feature vector, the first version being an earlier version than the second version; and
   selecting the feature-vector conversion model out of a plurality of feature-vector conversion models to convert the first feature vector to the second feature vector based on the first feature vector being a first-version feature vector, wherein each of the plurality of feature-vector conversion models is trained to convert a respective particular version feature vector to the second-version feature vector.

4. The method of claim 3, further comprising adding a feature-vector conversion layer to the second deep-learning model, wherein the feature-vector conversion layer comprises the plurality of feature-vector conversion models, and wherein the feature-vector conversion layer takes as input the first feature vector and outputs the second feature vector.

5. The method of claim 1, wherein the second feature vector comprises an approximation of a particular second-version feature vector obtainable by processing the image using the second deep-learning model.

6. The method of claim 1, wherein processing power used by the feature-vector conversion model to convert the first feature vector to the second feature vector for the image is less than processing power necessary to generate the second feature vector directly from the image using the second deep-learning model.

7. The method of claim 1, wherein retrieving the first feature vector comprises accessing the image, the first feature vector being stored in association with the image.

8. The method of claim 1, wherein the feature-vector conversion model comprises a neural network.

9. The method of claim 8, wherein the feature-vector conversion model comprises fully-connected layers.

10. The method of claim 1, wherein the feature-vector conversion model is trained to minimize error in converting first-version feature vectors to second-version feature vectors.

11. One or more computer-readable non-transitory storage media embodying software that is operable when executed to:
- retrieve an image;
- retrieve a first feature vector for the image, wherein:
  - the first feature vector is a first-version feature vector,
  - the first feature vector is generated by a first deep-learning model of a first version,
  - the first deep-learning model is trained to perform image classification with respect to a first set of concepts, and
  - the first feature vector comprises output from a processing layer of the first deep-learning model for the image;
- retrieve a second deep-learning model requiring second-version feature vectors, wherein the second deep-learning model is an updated version of the first deep-learning model trained to perform image classification with respect to the first set of concepts and an additional set of concepts;
- process the first feature vector using a feature-vector conversion model to obtain a second feature vector for the image, wherein the second feature vector is a second-version feature vector, and wherein the feature-vector conversion model is trained to convert first-version feature vectors to second-version feature vectors; and
- process the second feature vector using the second-deep learning model, to generate a plurality of predictions for the image, wherein each of the plurality of predictions comprises a likelihood that a respective concept of the additional set of concepts is associated with the image.

12. The media of claim 11, wherein the processing layer from which the first feature vector is outputted is a layer beneath an output layer of the first deep-learning model.

13. The media of claim 11, wherein the software is further operable when executed to:
- determine that the first feature vector is the first-version feature vector, the first version being an earlier version than the second version; and
- select the feature-vector conversion model out of a plurality of feature-vector conversion models to convert the first feature vector to the second feature vector based on the first feature vector being a first-version feature vector, wherein each of the plurality of feature-vector conversion models is trained to convert a respective particular version feature vector to the second-version feature vector.

14. The media of claim 13, wherein the software is further operable when executed to add a feature-vector conversion layer to the second deep-learning model, wherein the feature-vector conversion layer comprises the plurality of feature-vector conversion models, and wherein the feature-vector conversion layer takes as input the first feature vector and outputs the second feature vector.

15. A system comprising: one or more processors; and a memory coupled to the processors comprising instructions executable by the processors, the processors operable when executing the instructions to:
- retrieve an image;
- retrieve a first feature vector for the image, wherein:
  - the first feature vector is a first-version feature vector,
  - the first feature vector is generated by a first deep-learning model of a first version,
  - the first deep-learning model is trained to perform image classification with respect to a first set of concepts, and
  - the first feature vector comprises output from a processing layer of the first deep-learning model for the image;
- retrieve a second deep-learning model requiring second-version feature vectors, wherein the second deep-learning model is an updated version of the first deep-learning model trained to perform image classification with respect to the first set of concepts and an additional set of concepts;
- process the first feature vector using a feature-vector conversion model to obtain a second feature vector for the image, wherein the second feature vector is a second-version feature vector, and wherein the feature-vector conversion model is trained to convert first-version feature vectors to second-version feature vectors; and
- process the second feature vector using the second-deep learning model, to generate a plurality of predictions for the image, wherein each of the plurality of predictions comprises a likelihood that a respective concept of the additional set of concepts is associated with the image.

16. The system of claim 15, wherein the processing layer from which the first feature vector is outputted is a layer beneath an output layer of the first deep-learning model.

17. The system of claim 15, wherein the software is further operable when executed to:
- determine that the first feature vector is the first-version feature vector, the first version being an earlier version than the second version; and
- select the feature-vector conversion model out of a plurality of feature-vector conversion models to convert the first feature vector to the second feature vector based on the first feature vector being a first-version feature vector, wherein each of the plurality of feature-vector conversion models is trained to convert a respective particular version feature vector to the second-version feature vector.

18. The system of claim 17, wherein the software is further operable when executed to add a feature-vector conversion layer to the second deep-learning model, wherein the feature-vector conversion layer comprises the plurality of feature-vector conversion models, and wherein the feature-vector conversion layer takes as input the first feature vector and outputs the second feature vector.

* * * * *